United States Patent
Simonsohn

(10) Patent No.: US 11,476,598 B2
(45) Date of Patent: Oct. 18, 2022

(54) PARTLY PRE-ASSEMBLED CABLE JOINT

(71) Applicant: Tyco Electronics Raychem GmbH, Ottobrunn (DE)

(72) Inventor: Thilo Simonsohn, Munich (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 0 days.

(21) Appl. No.: 17/177,734

(22) Filed: Feb. 17, 2021

(65) Prior Publication Data
US 2021/0175644 A1 Jun. 10, 2021

Related U.S. Application Data

(63) Continuation of application No. PCT/EP2019/072023, filed on Aug. 16, 2019.

(30) Foreign Application Priority Data

Aug. 21, 2018 (EP) .................................. 18189950

(51) Int. Cl.
*H01R 4/00* (2006.01)
*H01R 4/72* (2006.01)
(Continued)

(52) U.S. Cl.
CPC ........... *H01R 4/726* (2013.01); *H01R 9/0524* (2013.01); *H02G 15/1806* (2013.01); *H02G 15/188* (2013.01)

(58) Field of Classification Search
CPC .. H01R 4/726; H01R 9/0524; H02G 15/1806; H02G 15/188
See application file for complete search history.

(56) References Cited

U.S. PATENT DOCUMENTS 5,868,584 A * 2/1999 Cook ....................... H01R 4/70
29/869
6,025,560 A * 2/2000 De Buyst ............. H02G 15/105
439/98
(Continued)

FOREIGN PATENT DOCUMENTS

CN 104781989 A 7/2015
DE 7608208 U1 7/1976
(Continued)

OTHER PUBLICATIONS

WO 2014/072258 A1 English translation published on May 5, 2014 (Year: 2014).*
(Continued)

*Primary Examiner* — Pete T Lee
(74) *Attorney, Agent, or Firm* — Barley Snyder

(57) ABSTRACT

A cable joint includes a cable joint body, a conductive connector disposed within the cable joint body and electrically connecting a first cable to a second cable, and a first conductive element electrically connecting a first shielding layer of the first cable to a second shielding layer of the second cable. The cable joint body includes a first insulating sleeve and a re-jacketing sleeve at least partly encompassing the first insulating sleeve. The re-jacketing sleeve forms a channel along a longitudinal axis of the first insulating sleeve. The first conductive element is disposed within the channel. The channel is collapsed after heat shrinking the first insulating sleeve and the re-jacketing sleeve.

13 Claims, 5 Drawing Sheets

(51) Int. Cl.
*H01R 9/05* (2006.01)
*H02G 15/18* (2006.01)
*H02G 15/188* (2006.01)

(56) References Cited

U.S. PATENT DOCUMENTS

| | | |
|---|---|---|
| 7,476,114 B1 | 1/2009 | Contreras |
| 2013/0295790 A1 | 11/2013 | Cornelius et al. |
| 2014/0051271 A1* | 2/2014 | De France ............... H01R 4/46 |
| | | 439/98 |
| 2015/0096803 A1* | 4/2015 | Pope .................. H02G 15/1806 |
| | | 174/84 R |
| 2017/0222423 A1* | 8/2017 | Nakamura ........... H02G 15/188 |
| 2017/0317481 A1 | 11/2017 | O'Sullivan |

FOREIGN PATENT DOCUMENTS

| | | |
|---|---|---|
| EP | 0272131 A2 | 6/1988 |
| EP | 3096405 A1 | 11/2016 |
| JP | 11234885 A | 8/1999 |
| JP | 2001231123 A | 8/2001 |
| WO | 2011069547 A1 | 12/2009 |

OTHER PUBLICATIONS

PCT Notification, The International Search Report and the Written Opinion, PCT International Application No. PCT/EP2019/072023, dated Aug. 29, 2019, 14 pages.

Chinese Office Action with English translation, Application No. 201980054605, dated Jun. 2, 2022, 15 pages.

\* cited by examiner

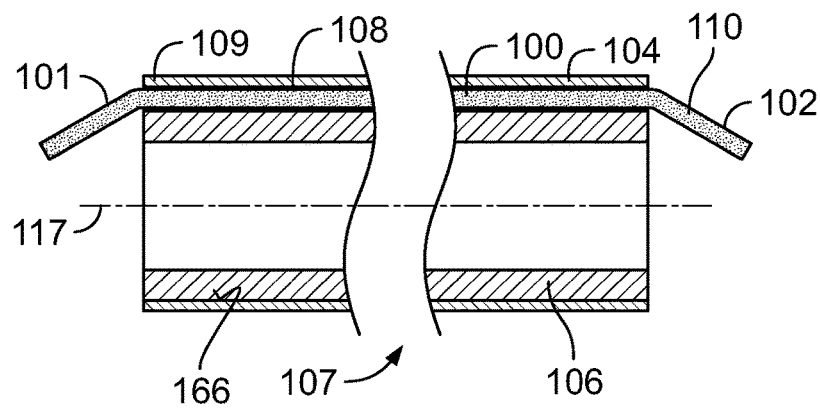
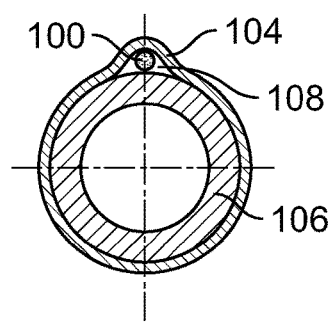
Fig. 1          Fig. 2
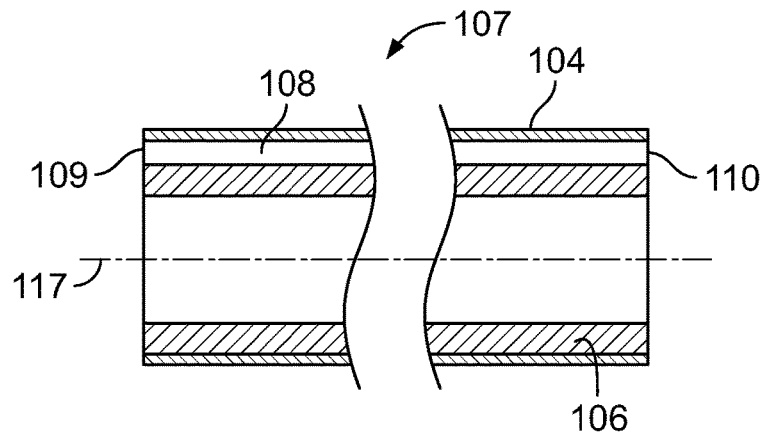
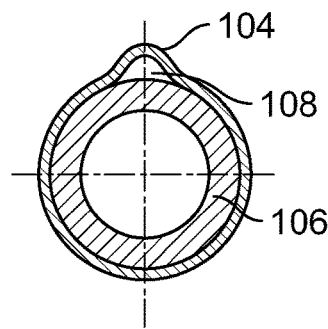
Fig. 3          Fig. 4
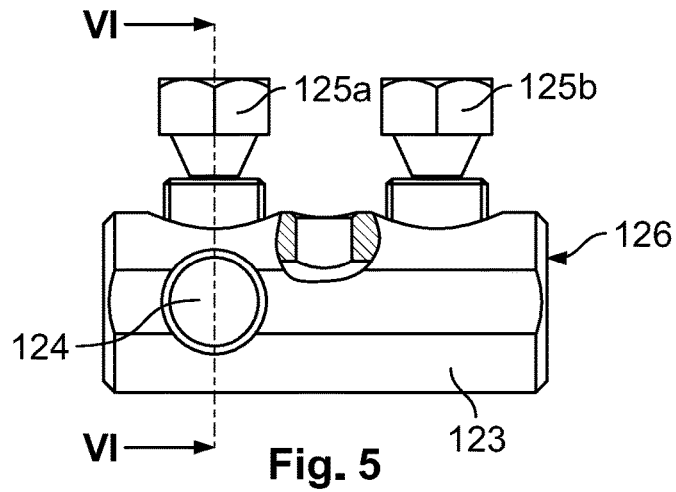
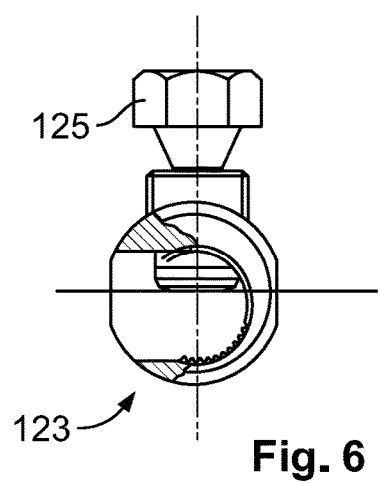
Fig. 5          Fig. 6

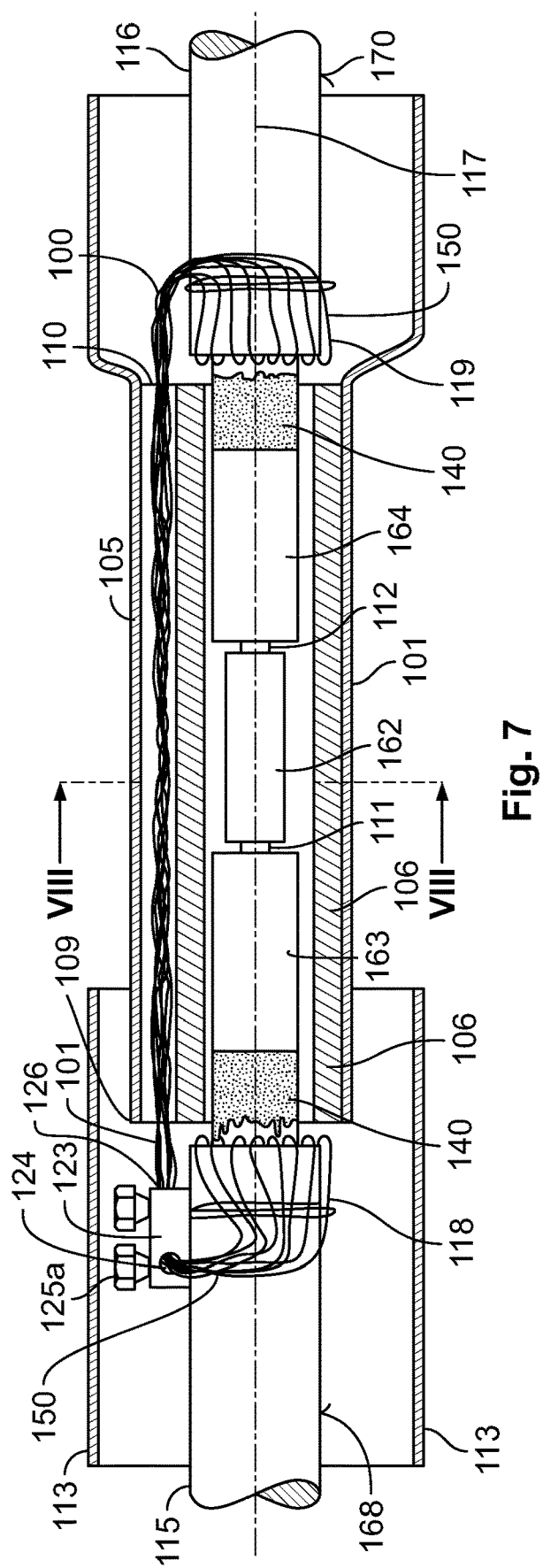
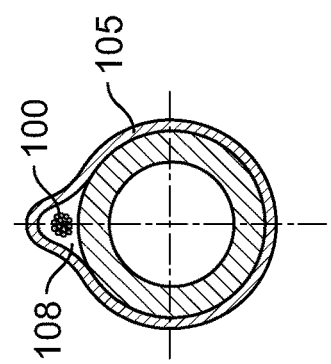
Fig. 7
Fig. 8

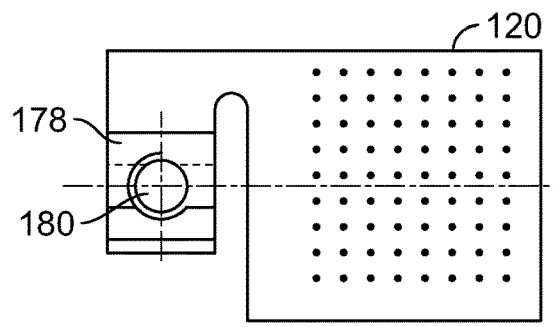 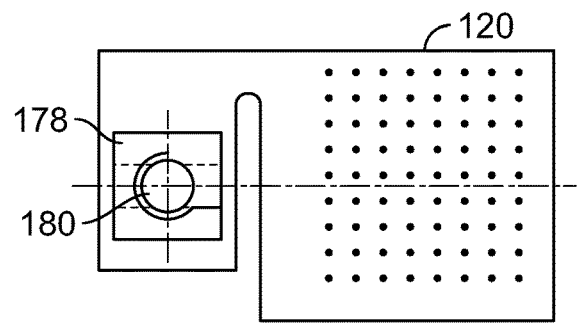
Fig. 15  Fig. 16
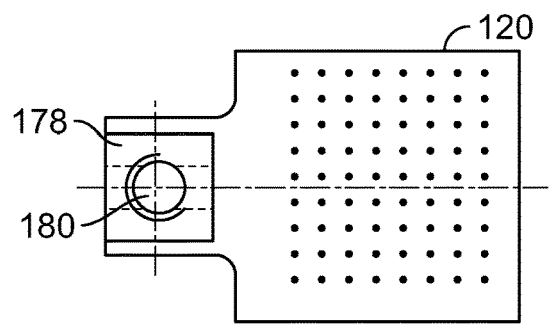
Fig. 17
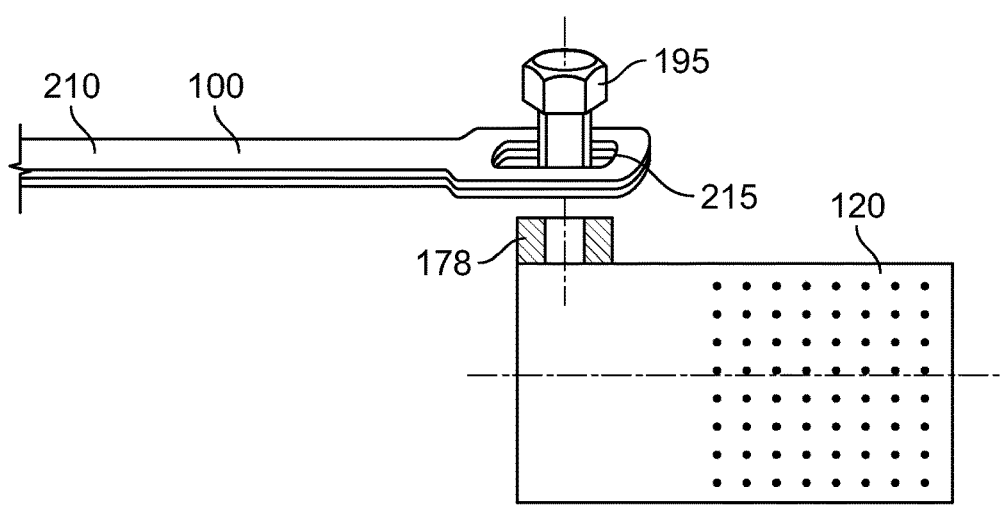
Fig. 18
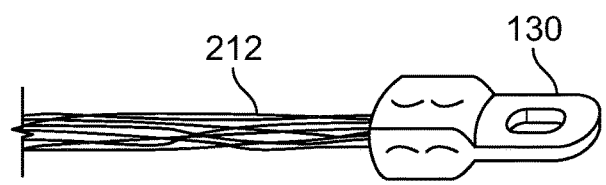
Fig. 19

US 11,476,598 B2

PARTLY PRE-ASSEMBLED CABLE JOINT

CROSS-REFERENCE TO RELATED APPLICATIONS

This application is a continuation of PCT International Application No. PCT/EP2019/072023, filed on Aug. 16, 2019, which claims priority under 35 U.S.C. § 119 to European Patent Application No. 18189950.1, filed on Aug. 21, 2018.

FIELD OF THE INVENTION

The present invention relates to a cable joint and, more particularly, to a shield connection for a cable joint.

BACKGROUND

Conventional power cables usually comprise multiple layers. The core of the cable comprises the actual single conductor or set of conductors. The next layer is a layer of carbon filled semiconductive material (here, the term "semiconductive" refers to a partially conductive material). The semiconductive layer is able to prevent voltage peaks by equalizing the electric field around the cable conductor(s). The next layer is the electrical insulation. Its wall thickness depends on the voltage class and the material type. The next layer is a further electrically conductive layer which serves as a shielding. Typically, a number metal wires or metallic tapes are positioned around the conductive layer. These are able to carry a defined electrical current. The outer semiconductive layer serves to shield the environment of the cable against electromagnetic radiation emitted from the cable core. The outmost layer is a further electrically insulating layer, which builds the jacket of the cable. It mainly serves as environmental seal, both mechanically and electrically.

A major part of conventional medium voltage (MV) cable joints comprise heatshrink joint bodies with separate mastics, stress control sleeves, or patches underneath. Onto these joint bodies, electrically conductive (metal) meshes are taped or metallic sockets are positioned. Shield wires are lead from one end of the joint to the other and are connected to the shield wires or tape shields. Finally, the entire connection area is covered by an outer protection sleeve, also referred to as rejacketing sleeve. The heatshrink joint bodies may be formed from a single multiple layered product or are being built from two or more sleeves of various materials (insulating, semiconductive). Another major part of the MV joints comprise cold applied joint bodies which are either built from extruded (multi-layered) sleeves, or the joint bodies are molded parts having semiconductive parts overmolded.

The following paragraphs describe in more detail how two terminals may be connected to each other using a heatshrink joint body.

First, the outer insulating re-jacketing layer is removed 20-60 cm from the end of each terminal. Then, depending on the cable construction, the cable jacket is removed and the shield wires are being folded back. Subsequently, the inner semiconductive layer is removed from the terminal to about 40 mm away from the cable jacket. Then, the edge line of the inner semiconductive layer may be taped with a stripe of mastic in order to void fill the step between semiconductive layer and the insulation layer and to cover (sharp) edges which can lead to voltage peaks, miniature flashes, and breakdowns.

In case of cables with tape shielding, the cable jacket is removed in a comparable manner as with wire shielded cables. The metallic tape shield may then be accessed e. g. through slits in the cable jacket.

Then, a heatshrink stress control sleeve may be positioned and shrunk on the cable by applying heat with a torch. Subsequently, the joint body and outer sleeve is put onto one terminal end. Then, the cable cores are connected with a connector of e. g. shear bolt technology, which comprises a cylindrical jacket with screws in radial direction. For each of the cable cores, one cable from one terminal is put into one end of the connector, and the corresponding cable from the other terminal is put into the other end of the connector. Each screw is turned into the connector until it shears-off. The remaining indentations from the screws are filled with filler putty, to smoothen the connection, again to prevent voltage peaks and to improve the shape of the installed mastic and heatshrink sleeves.

Subsequently, the shear bolt connector may be enwrapped with a stress control patch. This could also be done by another heatshrink sleeve with stress grading properties. Then, a joint body, a muffle consisting of multiple layers of different materials, is drawn over the shear bolt connector, until it covers the whole space from the end of the cable jacket/inner semiconductive layer of the first cable to the cable jacket/end of the inner semiconductive layer of the second cable. In other executions, multiple heatshrink sleeves are installed subsequently.

Then, a copper mesh shielding may be applied, in the form of a copper band, which is wrapped around the joint body. This may be done in multiple partially overlapping winds. It may enclose the shield wires, which are connected directly with a connector of similar type like the connector for the conductor.

In the case of tape shielded cables, the shields may be contacted with metal blanks having raised portions, which puncture the tape shield layer and e.g. having short metallic braids. Then typically metal sockets are positioned over the joint body. The connection of the braid ends with the short braids of the metal blanks contacting the tape shield layers is done by roll springs.

Finally, the outer sealing sleeve is drawn over the jointing area. Typically, these sleeves seal for about 100 mm on each cable jacket. This again may be shrunk by applying heat with a torch.

Heatshrinking with a torch is hazardous. It may harm the installer and it may produce fumes. Also in case of improper handling, it may harm the heatshrink products e.g. by overheating causing blisters. Heatshrinking is also skill sensitive. Especially shrinking the products evenly around the circumference requires proper jointer skills and experience. These problems may be approached in the future by using electrical heating integrated into the heat shrink joint products. Among the approaches towards implementing heatshrink joint bodies through integrated electrical heating, there is one option where the re-jacketing sleeve or at least parts of it are pre-positioned/pre-shrunk onto the joint body. In this case, as the main problem is to maintain the continuity of the outer shield, as a sequential installation step after installing the joint body and before the installing the re-jacketing sleeve, like with the standard heatshrink joints, is no longer possible.

U.S. Pat. No. 7,476,114 discloses an integral, unitary cover assembly for covering an electrical connection between first and second electrical cables each having a primary conductor and a neutral conductor includes an inner elastomeric sleeve, an outer elastomeric sleeve, and a duct member. The inner sleeve defines a cable passage to receive the electrical connection and the primary conductors of the first and second cables. The outer sleeve surrounds the inner sleeve. The duct member is interposed between the inner and outer sleeves. The duct member defines a neutral conductor passage configured to receive at least one of the neutral conductors there through. In some embodiments of the invention, the cover assembly is a cold shrink cover assembly.

Cold shrink cover assemblies, however, suffer from performance issues and from having higher production cost. Hence, it is desirable to combine the idea of a channel guiding a conductor between the two conductive shielding layers of the two cables with a heat shrinking approach. Furthermore, tailored designs for the connection of the terminals of the connector with the conductive shielding layers are needed to optimize the installation procedure for cable joints.

Consequently, the problem underlying the present invention is to provide a cable joint body and a cable joint, which are compatible with torchless heatshrinking technologies done in one installation sequence, at the same time being economic to fabricate, easy to install, and safe and long-term stable after being installed.

SUMMARY

A cable joint includes a cable joint body, a conductive connector disposed within the cable joint body and electrically connecting a first cable to a second cable, and a first conductive element electrically connecting a first shielding layer of the first cable to a second shielding layer of the second cable. The cable joint body includes a first insulating sleeve and a re-jacketing sleeve at least partly encompassing the first insulating sleeve. The re-jacketing sleeve forms a channel along a longitudinal axis of the first insulating sleeve. The first conductive element is disposed within the channel. The channel is collapsed after heat shrinking the first insulating sleeve and the re-jacketing sleeve.

BRIEF DESCRIPTION OF THE DRAWINGS

The invention will now be described by way of example with reference to the accompanying Figures, of which:

FIG. 1 is a sectional side view of a heat shrink joint body with a conductive element pre-installed on the heat shrink joint body;

FIG. 2 is a sectional end view of the heat shrink joint body of FIG. 1;

FIG. 3 is a sectional side view of heat shrink joint body with a channel and without a conductive element;

FIG. 4 is a sectional end view of the heat shrink joint body of FIG. 3;

FIG. 5 is a side view of a bolt connector;

FIG. 6 is a sectional end view of the bolt connector, taken along line VI-VI of FIG. 5;

FIG. 7 is a sectional side view of a cable connection according to an embodiment;

FIG. 8 is sectional end view of the cable connection, taken along line VIII-VIII of FIG. 7;

FIG. 15 is a side view of a cheesegrater with a bolt connector according to another embodiment;

FIG. 16 is a side view of a cheesegrater with a bolt connector according to another embodiment;

FIG. 17 is a side view of a cheesegrater with a bolt connector according to another embodiment;

FIG. 18 is a perspective view of a conductive element according to an embodiment and a cheesegrater; and FIG. 19 is a perspective view of a conductive element with a lug.

DETAILED DESCRIPTION OF THE EMBODIMENT(S)

Figure 9:
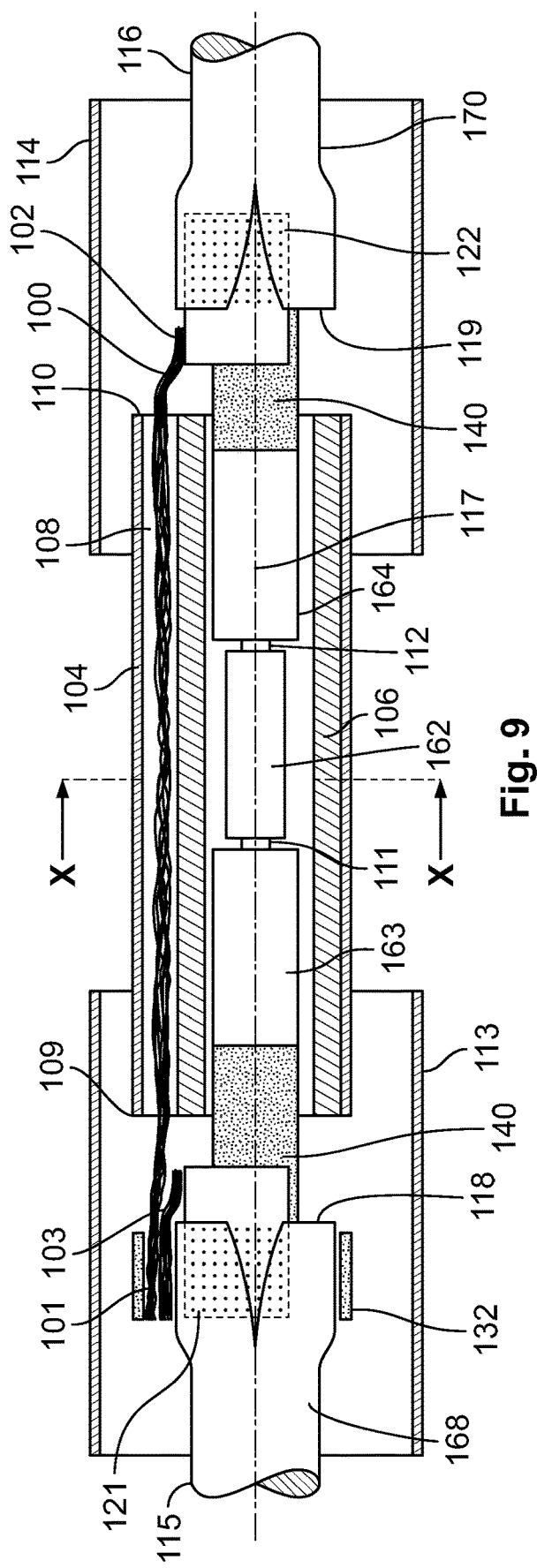
FIG. 9 is a sectional side view of a cable connection according to another embodiment.

The accompanying drawings are incorporated into the specification and form part of the specification to illustrate several embodiments of the present invention. These drawings, together with the description, serve to explain the principles of the invention. The drawings are merely for the purpose of illustrating examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings, in which like references refer to like elements.

FIGS. 1 and 2 show cross sections through a heatshrink joint body 106 having a heatshrink layer, also referred to herein as an insulating sleeve or a first insulating sleeve, with a metallic conductive element 100 pre-installed on it. The conductive element 100 has a first end 101 and an opposite second end 102. The term "pre-installed" means prior to delivery to customers. The conductive element 100 may, for instance, be formed from a metallic braid, a wire, or a plurality of wires or a plurality of metal foils or blanks. The conductive element 100 may also be referred to as a shield connector or a first conductive element. However, it is clear for a person skilled in the art, that any other electrically conductive material and construction may also be used.

In FIG. 1, a cross section along the longitudinal axis 117 is shown, and in FIG. 2, a cross section normal to the longitudinal axis 117 is depicted. A passage for the cable cores is enclosed by the insulating sleeve 106 on which a re-jacketing sleeve 104 comprising an insulating material is positioned. A cable joint body 107 includes the heatshrink joint body 106 and the re-jacketing sleeve 104.

The re-jacketing sleeve 104 may additionally comprise an inner electrically conductive joint layer 166 for providing a complete shielding around a cable joint body 107. The electrically conductive joint layer 166 may, for instance, be formed by a metal mesh or a film that encloses at least parts of the joint body 106 and at least parts of the channel 108 and at least parts of an electrically conductive outer layer of the first insulating sleeve 106. In an embodiment, the conductive joint layer 166 encloses almost the entire outer surface of the first insulating sleeve 106 and almost the entire channel and is executed as one metal film with a thickness between 5 microns and up to 200 microns, or in the magnitude of 15 microns to 100 microns. The metal of the conductive joint layer 166, in an embodiment, may be copper without tinning in order to prevent unfortunate combinations of metals, as shielding wires are in most cases formed from copper.

As can be seen from FIG. 1, the re-jacketing sleeve 104 forms a passage or channel 108 through which the conductive element 100 extends. The channel 108 has a first end 109 and an opposite second end 110. The conductive element 100 pre-installed in the cable joint body 107 forms a cable joint according to an embodiment, also referred to as a joint assembly. The electrically conductive element 100 can be a rod, a number of wires, a braid and/or a number of stripes. In an embodiment, this element 100 has a certain elasticity to allow for conforming to the outer shape of the installed joint body 107 to some extent. Otherwise this element 100 may cause areas of increased stretch of the re jacketing sleeve 104, which deforms and/or may cause puncture of it during and/or after the installation or create too much thinning of the sleeve 104, which may lead to splitting after the installation and when buried in the ground and/or it may lead to a reduction of the wall thickness such that the cable joint would not pass electrical cable jacket tests e.g. at 5 kV or 10 kV.

The embodiment shown in FIGS. 1 and 2 has the advantage that the re-jacketing sleeve 104 is pre-installed on the heatshrink joint body 106. Thereby, the installation of the cable joint can be done more quickly on-site, knowing that in most applications further pieces of re-jacketing sleeve 113, 114 like the one shown in FIG. 9 are required to be installed. The configuration also ensures that the continuity of the outer shielding, which is required to keep the outer shielding at the same potential everywhere, can be maintained.

Furthermore, the complete cable joint body 107 can conveniently be shrunk by application of heat in a one-step installation of the joint body 106 and the re-jacketing sleeve 104, collapsing the channel 108. This allows a simple way of fitting the cable joint body 107 to the joint of the cable cores 111, 112 and adapting the size of the cable joint to the size and shape of the cable cores 111, 112 including the herein mentioned devices e. g. for connecting the cores 111, 112 and providing the stress grading. It also eliminates the need for e.g. taping a metal mesh like with many of the standard heatshrink joint constructions. It subsequently eliminates the need for waiting until the joint body 106 has cooled down to an appropriate temperature before taping a metal mesh. The shrinking of the re-jacketing sleeve 104 also guarantees that air pockets underneath the re-jacketing sleeve 104 are reduced to a minimum after installation. This is helpful for a better heat transfer from the interior of the joint to the environment during service as well as being mechanically more robust when having minimal air pockets underneath the re-jacketing sleeve 104. Thus, this construction allows installation in one heatshrink process, reducing the risk of installation errors and saves installation time. In case of installation by integrated heater systems, this construction allows to fully automate some of the steps of heatshrink installation of joints.

In another embodiment, the cable joint body 107 may be provided to a customer without a conductive element 100 of its own. In this case, wires of a cable shielding 118, 119 which is already present on site may be introduced into the channel 108, as described below with respect to the embodiment of FIG. 7. FIGS. 3 and 4 show cross sections through a cable joint body 107 with a channel 108 between the first insulation sleeve 106 and the re jacketing sleeve 104 without the conductive element (a braid or the like) 100 being pre-installed in the joint assembly.

The arrangement shown in FIGS. 3 and 4 allows to push an electrically conductive element through it in the course of the installation of the joint in the field—for example prior to shrinking the joint body 106 and the re-jacketing sleeve 104. In an embodiment, the shrinking of the joint body 106 and of the re jacketing sleeve 104 creates a certain pressure onto the metallic element 100 to then create an electrical contact between it and the i.e. metal mesh or film which may enclose the joint body 106 and the channel 108 at least partly which then creates contact to the conductive shielding layer of the joint body 107.

In order to select the appropriate connection of the shielding layers 118, 119 of the cables 115, 116, shown in FIGS. 7 and 9, the type of shielding layers 118, 119 are to be considered. The majority of the MV power cables have either a wire shield or a tape shield. In case of wire shielding, the connection of the metallic element can be done through using standard connectors (mechanical connectors such as bolt connectors or crimp connectors). For instance, FIGS. 5 and 6 show a bolt connector 123 with two shear off screws 125. As will be apparent in more detail from the following FIG. 7, the bolt connector 123 receives the electrically conductive element 100 through an inlet 126. The wires from the shielding layers 118, 119 are inserted into a side opening 124 of the bolt connector 123. Both the side opening 124 and the inlet 126 may be referred to as an opening. This design is chosen to reduce the overall length of the screen wire connection. The side opening 124 also allows an easier insertion of the shield wires 118, 119 as rotation is a degree of freedom when installing such joints.

FIGS. 7 and 8 show sectional views of a cable connection connecting two cables 115, 116 according to an embodiment. In an embodiment, each of the cables 115, 116 is a power cable. According to this embodiment, the shield wires of the shielding layer 119 of one of the cable 116 are used as the conductive element 100. A conductive connector 162 electrically connects cable cores 111, 112 on the two cables 115, 116. The conductive connector 162 is sandwiched between the end regions of two insulating layers 163, 164 which surround the cable cores 111, 112. Each of the insulating layers 163, 164 is surrounded by a semiconductive shielding layer 140. Shield wires of the shielding layers 118, 119 running parallel to the longitudinal or cable axis 117 are located on the outside of the shielding layers 140. The shield wires of the shielding layers 118, 119, are surrounded by cable jackets 168, 170.

As shown in FIG. 7, each of the cable jackets 168, 170 is removed from a region close to the cable terminals, and on each side the shield wires of the shielding layers 118, 119 are tucked back, and fixed with a wire wrapped azimuthally around the corresponding cable jacket 115, 116. The part of the shield wires 119 behind the wrapped wire is patted into a braid 150 to form the conductive element 100 in the shown embodiment.

At the boundary between the region of the insulating layers 163, 164 covered by the semiconductive layers 140 and the region where the cable jackets 168, 170 have been removed, various elements for stress grading may applied. This may be i.e. taping mastics and installing short pieces of stress grading heatshrink sleeves. This encapsulation is in order to smoothen the surface and fill voids to prevent voltage peaks, also reducing sharp edges.

The region of the insulating layers 163, 164 of the two cable terminals not covered by the cable jackets 115, 116, as well as the conductive connector 162, which connects the cables cores 111, 112, are covered by the electrically insulating heatshrink joint body 106 as shown in FIG. 7. The heatshrink joint body 106 is covered by the re-jacketing sleeve 104. The braid 100 from the second terminal runs parallel to the cable axis 117 toward the first terminal, through a channel 108 formed by the re-jacketing sleeve 104.

At the first cable jacket 168, a bolt connector 123 with two screws 125 in radial orientation (as shown in FIGS. 5 and 6) is mounted on an end of the first cable 115, with its longitudinal axis being parallel to the cable axis 117. The bolt connector 123 holds the first end 101 of the conductive element 100.

As shown in FIG. 7, the bolt connector 123 has a first hole 124 in azimuthal direction and a second hole 126 in axial direction. The first screw 125a of the bolt connector resides at the position where both holes 124, 126 cross each other. The second screw 125b resides at a position toward the end of the cable terminal. The terminal of the braid 100 from the second terminal is inserted in the hole 126 in axial direction, and the braid 150 from the first terminal is inserted in the hole 124 in azimuthal direction. Both braids 150, 100 are fixed via screws 125a, 125b. The bolt connector 123 fixing the braids 150, 100 on the first terminal, and a first end 109 of the heatshrink joint body 106, are covered by an additional re-jacketing sleeve 113 comprising an insulating material. The additional re-jacketing sleeve 113 may for instance comprise a heatshrink material.

Figure 10:
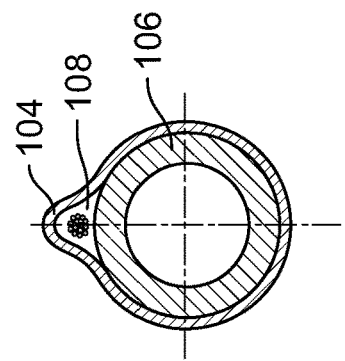
FIG. 10 is a sectional end view of the cable connection, taken along line X-X of FIG. 9.

For cables 115, 116, which do not have a metal wire shield as the shielding layers 118, 119, but instead have a metal tape shielding layer, 118, 119, a cable connection according to another embodiment is shown in FIGS. 9 and 10. This arrangement with some adaptations may of course also be used for wire shielded cables. At both ends 101, 102 of the conductive element 100, the cable jackets 168, 170 are removed from an area close to the ends 101, 102. Further, the cable jackets 168, 170 are slit and bent apart. This is to allow mounting electrically conductive contacting elements, so-called cheesegraters 121, 122. The cheesegrater 121 may be referred to as a second conductive element and the cheesegrater 122 may be referred to as a fourth conductive element. These serve as electrical contact elements; the cheesegrater 121 surrounding and contacting the tape shielding 118 of the first cable 115. The cheesegrater 122 surrounds the semiconductive layer 140 of the second cable 116 and is at least partially surrounded by the tape shield 119 of the second cable 116. The cheesegrater 121, 122 is a metal blank with an area having a number of sharp elements to protrude through the tape shield 118, 119 of the cable 115, 116.

FIGS. 9 and 10 show a cable connection including a conductive connector 162 which connects the cable cores 111, 112. Each cable core 111, 112 is surrounded by an insulating layer 163, 164 and an i.e. co-extruded semiconductive layer 140. The edge of it may be taped with a mastic.

As shown in FIG. 9, a second end of a first braid 103 is fixed on the cheesegrater 121 at the first end 101 of the conductive element 100. A first end of the first braid 103 is positioned on an outside of the first cable jacket 168 of the first cable 115. The first braid 103 may also be referred to as a third conductive element.

On the cheesegrater 122, the second end 102 of the conductive element 100, here a second braid is fixed, as shown in FIG. 9. The second braid 100 runs through a channel 108 formed between the re jacketing sleeve 104 and the heatshrink joint body 106. A first end 101 of the second braid 100 is positioned on top of the cable jacket 168 and on top or close to the first end of the first braid 103. The fixing and electrical contact is done via a roll spring 132; the roll spring 132 surrounds the first cable 115 and holds the first end 101 of the conductive element 100. The roll spring 132 also surrounds the semiconductive layer 140 of the first cable 115 and clamps the third conductive element 103 between the roll spring 132 and the first cable jacket 168.

The re-jacketing sleeve 104 is spaced from both ends 101, 102 of the conductive element 100 in the embodiment of FIGS. 9 and 10. Each of the ends of the re-jacketing sleeve 104 is covered by an additional first re-jacketing sleeve 113 and an additional second re-jacketing sleeve 114 associated with the respective end 101, 102 which also covers the cheesegraters 121, 122 and a part of the cable jackets 168, 170 at a side of the cheesegrater 121, 122 distant from the corresponding cable terminal. The re-jacketing sleeve 104 and an end of the shield wires 118, also referred to as a first shielding layer, are covered by the additional first re-jacketing sleeve 113, making the transition from the re-jacketing sleeve 104 to the first shielding layer 118 waterproof. The re jacketing sleeve 104 and an end of the shield wires 119, also referred to as a second shielding layer, are covered by the additional second re-jacketing sleeve 114, making the transition from the re-jacketing sleeve 104 to the second shielding layer 119 waterproof.

Alternatively to a braid, the shield connector 100 or first conductive element may also be a rod or a stack of blanks 210, as shown in FIG. 18. This has the advantage that the shield connector 100 is more stable against bending and may be more easily pushed into the channel 108, in case the connector 100 is inserted into the channel 108 during installation of the cable joint. The shield connector 100 may also be pre-installed in the channel 108 and may have cheesegraters 121, 122 pre-installed on either end by welding or soldering or the like.

Figure 11:
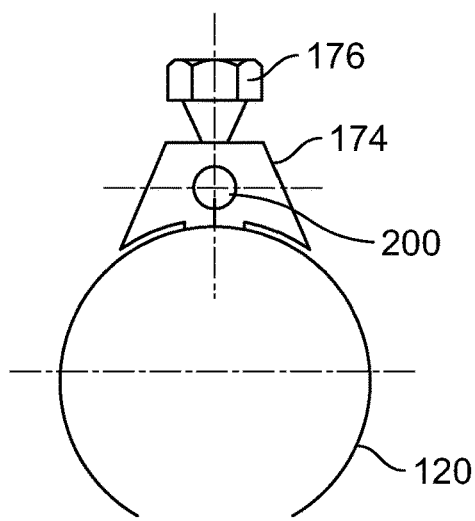
FIG. 11 is a side view of a cheesegrater with a bolt connector according to an embodiment.

Alternatively, the terminals of the braids may be fixed to the cheesegraters 121, 122 using bolt connectors 174 with, e.g., a single screw 176, as shown in FIGS. 11 to 17. FIG. 11 shows a cross section through a bolt connector 174 associated with a cheesegrater 120, and FIGS. 12 to 17 depict further views of such connectors 174.

Figure 12:
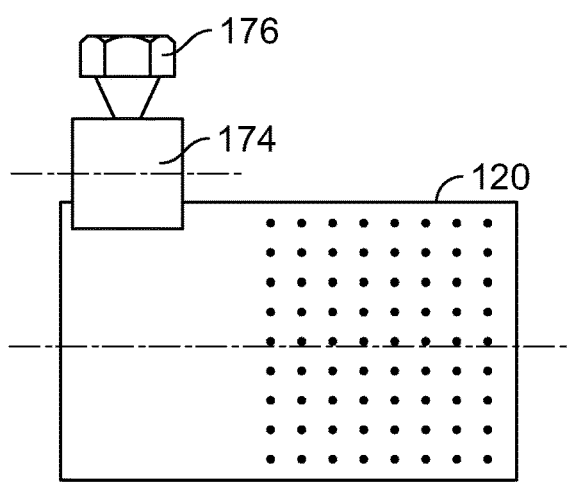
FIG. 12 is a side view of a cheesegrater with a bolt connector according to another embodiment.
Figure 13:
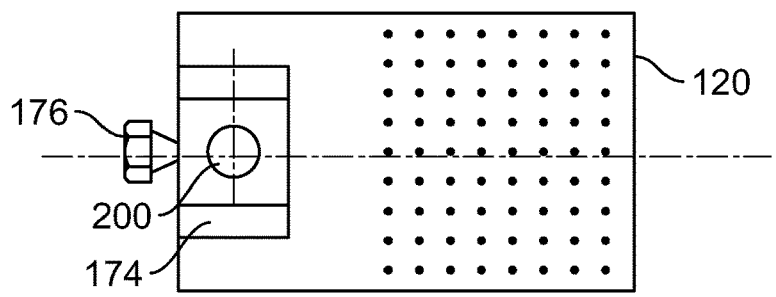
FIG. 13 is a side view of a cheesegrater with a bolt connector according to another embodiment.

The connector 174 shown in FIG. 11 corresponds to the connector shown in FIG. 12. FIGS. 11 and 12 indicate a hole 200 into which a braid or a rod or a number of wires or a stack of blanks may be inserted. This hole 200 may be parallel to a cable axis, as shown in FIG. 11 and FIG. 12. This has the advantage that the hole 200 points in the same direction as the conductive element 100, such that bending the conductive element 100 is not required.

Figure 14:
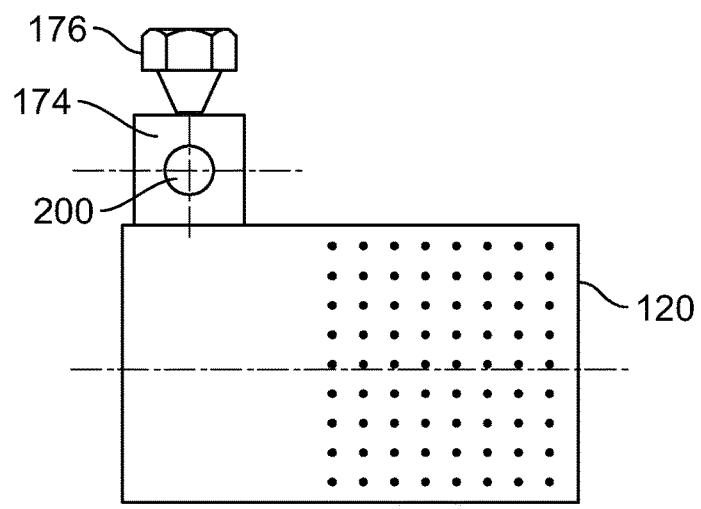
FIG. 14 is a side view of a cheesegrater with a bolt connector according to another embodiment.

Alternatively, the hole 200 may be oriented in a radial (FIG. 13) or an azimuthal orientation (FIG. 14). This has the advantage that the hole 200 points in a different direction than the axis of the cable, such that the terminal of the conductive element 100 may be fixed more tightly in the hole 200, as there is also a form-fit. This helps in case the cable terminals are pulled apart from each other.

Further embodiments of cheesegrater-associated bolt connectors 178 with bores 180 for a screw are shown in FIGS. 15, 16, and 17. As indicated in FIGS. 15, 16, and 17, the bolt connector 178 may be mounted on a part of the cheesegrater 120 with only a small connection between the part of the cheesegrater 120 fixed on the cable and the part of the cheesegrater 120 fixed to the bolt connector 178 to which the terminal of the connector is fixed. Executions like in FIGS.

15 and 16 allow more flexibility of the main part of the cheesegrater 120 with respect to the part where the bolt connector 178 is fixed than the execution shown in FIG. 17. Even the execution shown in FIG. 17 allows more flexibility of the main part of the cheesegrater 120 with respect to the part where the bolt connector 178 is fixed than if the bolt connector 178 would be fixed to a standard blank. Hence, all the embodiments shown in FIGS. 15, 16, and 17 simplify the installation of the cheesegrater 120 through bending according to the diameter of the semiconductive layer of the cable.

FIG. 18 shows a further embodiment of the invention, wherein the conductive element 100 is a stack of blanks 210. It is fixed to the terminal of the cable 115 via slits at the terminals of the blanks 210. This has the advantage that the end of the shield connector 100 may be easily fixed to the cable via a screw. An opening 215 is provided, which allows a screw 195 to pass through to the connector 178. By using elongated holes for the opening 215, tolerances may be dealt with in an easy way. This design also eliminates the need for a bolt connector 174, providing a simpler and lower cost design.

FIG. 19 shows that, in a further embodiment of the invention, if the shield connector is a braid 212, its end may be fixed to the terminal of the cable 115 via a cable lug 130. This has the advantage that the terminal of the shield connector may be easily fixed to the cable 115 via a screw.

In summary, the present invention provides heatshrink joint products that establish a continuity of the current carrying shielding layers 118, 119 as well as of the semiconductive shielding 140 of the cables 115, 116 which are to be connected. The current of the shield layers 118, 119 is guided by the electrically conductive element 100, whereas the continuity of the semiconductive layers 140 of the cables 115, 116 may be ensured by a semiconductive layer provided at the outside of the joint body 106.

The present invention may be used with integrated heating systems especially if the re-jacketing sleeve 104, 105 is pre-installed. However, some of the concepts described above may also be used with standard products and standard installation methods. The concepts described above are designed primarily for medium voltage (MV) joint bodies designed for voltages from 12 to 42 kV. It is clear for a person skilled in the art, however, that the principles of the present invention are also applicable for other voltage classes and products.

What is claimed is:

1. A cable joint, comprising:
  a cable joint body including a first insulating sleeve and a re-jacketing sleeve at least partly encompassing the first insulating sleeve, the re-jacketing sleeve forms a channel along a longitudinal axis of the first insulating sleeve, the channel is collapsed after heat shrinking the first insulating sleeve and the re-jacketing sleeve;
  a conductive connector disposed within the cable joint body and electrically connecting a first cable to a second cable;
  a first conductive element disposed within the channel and electrically connecting a first shielding layer of the first cable to a second shielding layer of the second cable;
  a second conductive element surrounding the first shielding layer; and
  a third conductive element electrically connecting the first conductive element and the second conductive element.

2. The cable joint of claim 1, wherein the first conductive element extends from a first end of the channel to a second end of the channel.

3. The cable joint of claim 1, further comprising a roll spring surrounding the first cable and holding a first end of the first conductive element.

4. The cable joint of claim 3, wherein the roll spring surrounds a first semiconductive layer of the first cable.

5. The cable joint of claim 4, wherein the first end of the first conductive element is clamped between the roll spring and the first semiconductive layer of the first cable.

6. The cable joint of claim 5, wherein a first end of the third conductive element is clamped between the roll spring and a first cable jacket of the first cable, and a second end of the third conductive element is fixed on the second conductive element.

7. The cable joint of claim 5, further comprising a fourth conductive element surrounding a second semiconductive layer of the second cable.

8. The cable joint of claim 7, wherein the fourth conductive element is at least partially surrounded by the second shielding layer of the second cable, the second shielding layer is a tape shield.

9. The cable joint of claim 7, wherein a second end of the first conductive element is fixed on the fourth conductive element.

10. The cable joint of claim 1, further comprising an additional first re-jacketing sleeve surrounding a first end of the re-jacketing sleeve and an end of the first shielding layer of the first cable.

11. The cable joint of claim 10, further comprising an additional second re-jacketing sleeve surrounding the re-jacketing sleeve and an end of the second shielding layer of the second cable.

12. The cable joint of claim 1, wherein the first conductive element is a braid of an electrically conductive sheet.

13. The cable joint of claim 1, wherein the channel contains a braid formed by a plurality of electrically conductive wires of the second shielding layer of the second cable, the electrically conductive wires extending from the second cable to the first cable, the braid is connected to another braid formed by a plurality of electrically conductive wires of the first shielding layer of the first cable.

* * * * *